X 8,912
J. P. Riding,
BEST AVAILABLE COPY
Clover Huller.
Patented June 12, 1835.
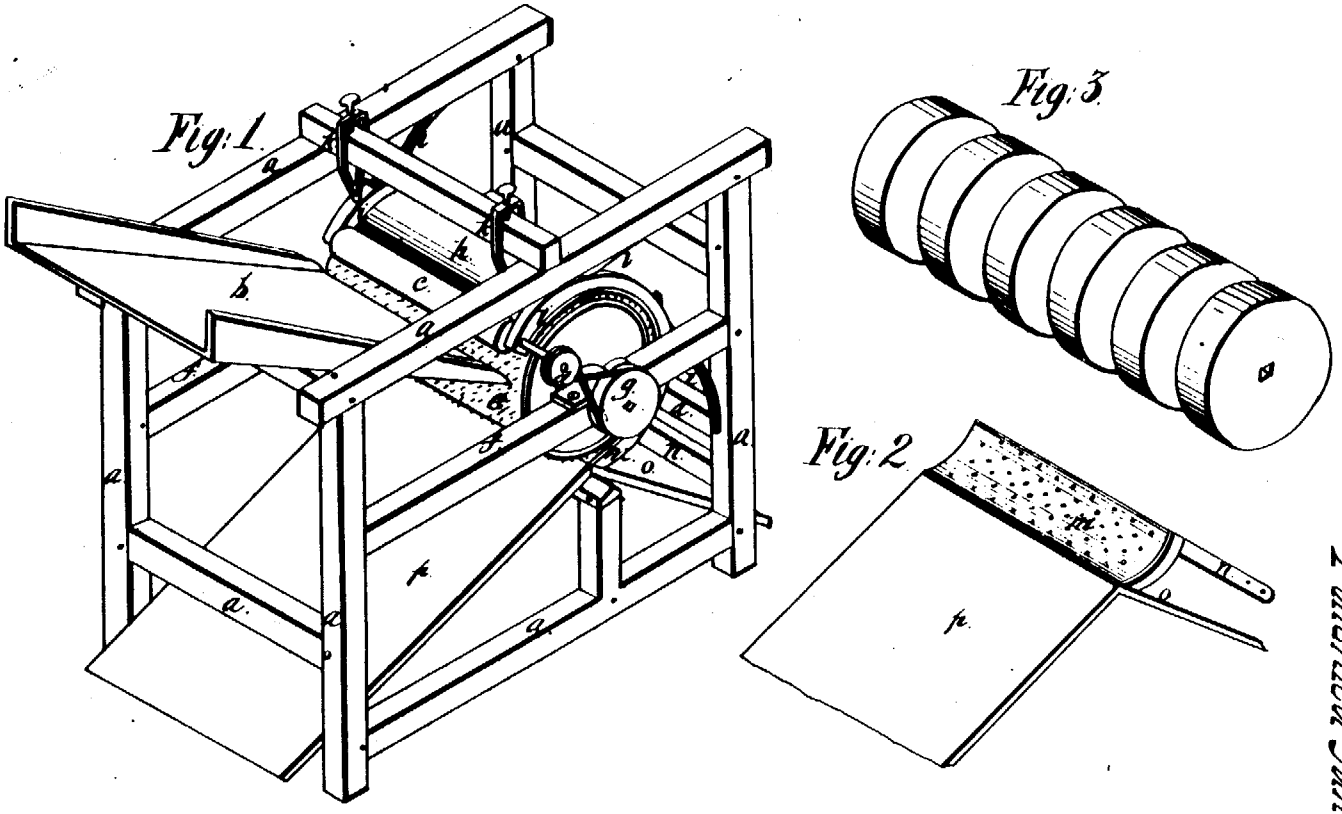
A. PETERS, PHOTO-LITHOGRAPHER, WASHINGTON, D. C.

June 19. 1835  8912X

John P. Ridings of Hillsborough,  Ohio
Letters Patent.

The Schedule to in these Letters Patent, and making part of the same, containing a description in the words of the said John P. Ridings himself of his improvement, in Thrashing of Clover Seed.

---

To all to whom these presents shall come: Be it known that I. John P. Ridings of Hillsbourough in the County of Highland and State of Ohio, have invented a new and useful improvement in threashing of clover seed, and that the following is a full and exact description thereof first the frame to be of any form to produce the desired effect, the cilinder to be made of heads with the grane of the wood changed any thickness to any size to suit they machine with a shaft through it to run on bushes or cilinder rails with a strap pully on one end of shaft and feeder pully on the other, the shealving or threashing floor to be made solid or caled together with fellows on each side to keep it from springing or warping. to extend far enough to carry the feeder & the feeder-gudgeons of feeder run in fellows of shelving, and is supported by them, the cord or strap passes round the head on cilinder shaft and round feeder pully & causes the feeder to run which draws in the seed & hull between the cilinder and shelving, the shelving is suspended at the feeder end of shelving by a cross piece made fast to top of frame, or the cross piece can be left portable with loops passing over it, and screwed to the fellows of shelving on each side, the regulating screws pass through the loops on the upper side, and the ends of screws strike against the cross piece, on top of frame, which enables you to set the shelving closer to the cilinder or wider just as is nessary, the springs to force the shelving to cilinder is four - and two is made fast to top of frame, to force the top of the shelving & feeder close on to the cilinder the other two are made fast on the back of frame for to force the shelving close against the regulating stops and screws, the stops are fast to frame & the regulating screws pass through the stops & strike against the progues in the lower end of shelving which forces the shelving to any distance from the cilinder to any distance that is nessary the seed and hull is put on feeding board which conveys it down to cilinder and feeder which causes it to pass between cilinder and shelving which sepperates the seed from the hull - the seed after leaving the shelving falls through a seperating screan and comes out at the back of machine, the hull or chaff passes on over screen and comes out under feeding board or table on the opposite side of machine by reason of dividing shorts - the cilinder is clothed with castings - the castings to be cast in plates of any size to suit the size of cilinder with small project-ing teeth or points of an eighth of an inch or more - the shelving is clothed with the same kind to be fastened on with screws, and when in opperation the teeth or points a comeing in contact with each other cut the hull of the seed perfectly cleane without injuring of the seed in the least, the screns can be made of tin or sheet iron with holes punched through to let the seed fall through - they machine can be made of any size to suit the Country or quantity of threashing to run or to be turned by hand or by horse or horses, they machine may allso be clothed with sheet iron punched so as to raise projecting beards, on the one side and clothe the cilinder & shelving with it and the beards or teeth comeing in contact get it out very well but it is not so dureable as the castings - the machine when reduced to be turned by hand must be double geard either by cog or strap - or else the speed of cilinder will not be great enough to get out the seed perfectly cleane when reduced to be turned by hand the frame can be to suit the conveniance of the ma-chine - What I claim as my own invention and not previously known in the above described machine is the the manner of applying the springs to the shelving so as to admit of the shelving giving way when needed - like-wise the loops & regulating screws on the principal which they act likewise they seperating screan to divide the seed from the chaff & the cast plates in the form I send you in the middle.

Witnesses
David M. Harman
David Creamer

John P. Ridings (Patented, 19 June 1835)
( Grainy [illegible] )

Eng.d
M.G.C.

[illegible]